(12) United States Patent
Delgado, Jr. et al.

(10) Patent No.: US 7,106,777 B2
(45) Date of Patent: Sep. 12, 2006

(54) PHASE-CHANGE HEAT EXCHANGER

(75) Inventors: Adon Delgado, Jr., West Hills, CA (US); Randall Gene Leonard, Simi Valley, CA (US); Alan Zachary Ullman, Northridge, CA (US)

(73) Assignee: The Boeing Company, Chicago, IL (US)

( * ) Notice: Subject to any disclaimer, the term of this patent is extended or adjusted under 35 U.S.C. 154(b) by 476 days.

(21) Appl. No.: 10/731,311

(22) Filed: Dec. 8, 2003

(65) Prior Publication Data

US 2004/0141539 A1 Jul. 22, 2004

Related U.S. Application Data

(63) Continuation-in-part of application No. 10/338,539, filed on Jan. 7, 2003, now abandoned.

(51) Int. Cl.
*H01S 3/095* (2006.01)
*B32B 3/26* (2006.01)

(52) U.S. Cl. ..................... 372/89; 428/305.5

(58) Field of Classification Search ................. 372/89; 428/305.5
See application file for complete search history.

(56) References Cited

U.S. PATENT DOCUMENTS

| | | |
|---|---|---|
| 3,052,094 A | 9/1962 | Fischer |
| 3,090,094 A | 5/1963 | Schwartzwalder et al. |
| 3,111,396 A | 11/1963 | Ball |
| 3,171,820 A | 3/1965 | Voltz |
| 3,362,818 A | 1/1968 | Schwarzkopf et al. |
| 3,408,180 A | 10/1968 | Winkler |
| 3,470,117 A | 9/1969 | Pearce |
| 3,616,841 A | 11/1971 | Walz |
| 3,946,039 A | 3/1976 | Walz |
| 4,096,450 A | 6/1978 | Hill et al. |
| 4,267,526 A | 5/1981 | McDermott et al. |
| 4,507,789 A | 3/1985 | Daly et al. |
| 4,808,558 A | 2/1989 | Park |
| 5,305,821 A | 4/1994 | Weingartner |
| 5,310,592 A | 5/1994 | Baker et al. |
| 5,322,725 A | 6/1994 | Ackerman et al. |
| 5,949,805 A | 9/1999 | Mordaunt et al. |
| 6,000,438 A | 12/1999 | Ohrn |
| 6,034,978 A | 3/2000 | Ujazdowski et al. |
| 6,037,032 A | 3/2000 | Klett et al. |

(Continued)

FOREIGN PATENT DOCUMENTS

EP 1 156 293 A2 11/2001

(Continued)

OTHER PUBLICATIONS

Kleltt, James W., "High Thermal Conductivity, Mesophase Pitch-Derived Carbon Foam", 43$^{rd}$ International SAMPE Symposium, May 31-Jun. 4, Anaheim, CA 1998.

*Primary Examiner*—Armando Rodriguez
(74) *Attorney, Agent, or Firm*—Ingrassia Fisher & Lorenz, P.C.

(57) ABSTRACT

A phase-change heat exchanger is provided for thermally conditioning a fluid. The phase-change heat exchanger includes, but is not limited to, conduits configured to convey the fluid through the phase-change heat exchanger and a foam structure in thermal contact with at least one of the conduits. The foam structure has ligaments interconnected to form a three-dimensional reticulated structure of open cells. A phase-change material is contained within the open cells and the phase-change material is configured to receive thermal energy of the fluid from the ligaments of the foam structure.

25 Claims, 6 Drawing Sheets

U.S. PATENT DOCUMENTS

| | | |
|---|---|---|
| 6,154,478 A | 11/2000 | Vetrovec |
| 6,307,871 B1 | 10/2001 | Heberle |
| 6,351,478 B1 | 2/2002 | Heberle |
| 6,570,895 B1 | 5/2003 | Heberle |
| 2003/0019757 A1 | 1/2003 | Vetrovec |
| 2003/0121637 A1 | 7/2003 | Lee et al. |

FOREIGN PATENT DOCUMENTS

| | | |
|---|---|---|
| FR | 2 026 088 A | 9/1970 |
| FR | 2 831 950 | 5/2003 |
| WO | PCT/US2001/07012 | 9/2001 |
| WO | PCT/US2004/040738 | 5/2005 |

PHASE-CHANGE HEAT EXCHANGER

CROSS-REFERENCES TO RELATED APPLICATIONS

This is a continuation-in-part application of U.S. application Ser. No. 10/338,539, filed Jan. 7, 2003 now abandoned.

FIELD OF THE INVENTION

The present invention generally relates to a heat exchanger, and more particularly relates to a phase-change heat exchanger.

BACKGROUND OF THE INVENTION

Heat exchangers are well known for thermally conditioning solids, liquids, and/or gases. Numerous heat exchanger configurations exist that are tailored for heating and/or cooling the temperature of solid, liquid, and/or gas of a system or device over a prolonged period or optimized for relatively short bursts of heat or cooling. For example, a Chemical Oxygen Iodine Laser (COIL) typically uses short bursts (i.e., minutes or seconds) of heating and cooling to maintain fluids and/or gases at relatively constant temperatures.

Short burst cooling and heating is currently provided by evaporation of cryogenic fluids and fired heaters or electrically heated packed beds, respectively. However, these cooling and heating mechanisms are complex. In addition, these cooling and heating mechanisms are better suited for operations over extended periods (i.e., hours, days or weeks).

Phase-change materials have shown promise for thermal conditioning. Phase-change materials, such as paraffin waxes, provide large heat capacities over narrow temperature ranges. Therefore, phase-change materials have desirable characteristics that can be used to heat or cool at high power levels. However, phase-change materials tend to have low thermal conductivities that make it difficult to transfer heat into and out of the phase-change material, which reduces the suitability for short burst cooling.

Accordingly, it is desirable to compensate for the low thermal conductivity of phase-change materials so that such a material can be used in high power and short burst thermal conditioning. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A phase-change heat exchanger is provided for thermally conditioning a fluid. The phase-change heat exchanger includes, but is not limited to, conduits configured to convey the fluid through the phase-change heat exchanger and a foam structure in thermal contact with at least one of the conduits. The foam structure has ligaments interconnected to form a three-dimensional reticulated structure of open cells. A phase-change material is contained within the three-dimensional reticulated structure of open cells and the phase-change material is configured to receive thermal energy of the fluid from the ligaments of the foam structure.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any expressed or implied theory presented in the preceding background of the invention or the following detailed description of the invention.

Figure 1:
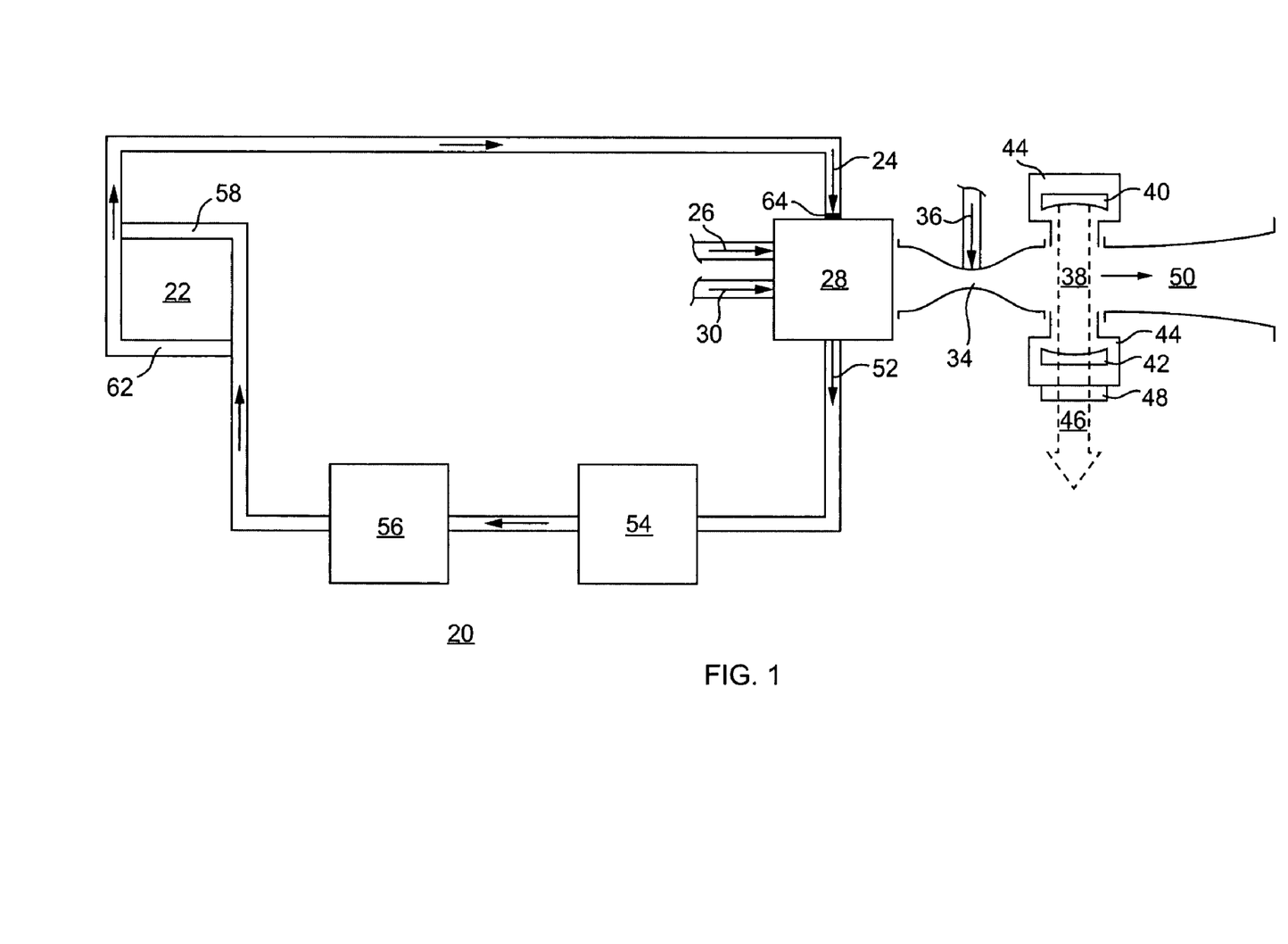
FIG. 1 is a COIL having the phase-change heat exchanger for thermally conditioning a fluid of the COIL in accordance with an exemplary embodiment of the present invention.

Referring to FIG. 1, a COIL 20 is illustrated having a phase-change heat exchanger 22 of the present invention for thermally conditioning a fluid of the COIL 20, which can be one or more gases, liquids, or combination of one or more gases and liquids. While the following detailed description of the invention describes thermally conditioning the fluid of the COIL 20, the phase-change heat exchanger 22 can be used to thermally condition one or more fluids of other lasers or used to thermally condition a fluid in a non-laser application.

The COIL 20 utilizes a reaction of chlorine gas ($Cl_2$) 26 and a Basic Hydrogen Peroxide (BHP) 24, such as potassium hydroxide (KOH) or sodium hydroxide (NaOH) mixed with hydrogen peroxide. The chlorine gas 26 and the BHP 24 are supplied to a singlet oxygen generator 28 for production of an excited oxygen gas in a metastable state, which is known as the singlet delta oxygen ($O_2(^1\Delta)$) or singlet molecular oxygen, according to the following reaction:

$$2K^+ + 2O_2H^- + Cl_2 \rightarrow O_2(^1\Delta) + H_2O_2 + 2KCl \qquad (1)$$

In addition to the BHP 24 and the chlorine gas 26, nitrogen gas ($N_2$) 30 can be provided to the singlet oxygen generator 28 as a diluent.

The mixture of the singlet delta oxygen, nitrogen gas 30 and non-reacted chlorine gas 26 is directed from the singlet oxygen generator 28 into a laser nozzle 34 where the singlet delta oxygen, nitrogen gas 30 and non-reacted chlorine gas 26 is mixed with iodine vapor ($I_2$) 36. This process facilitates an energy transfer from the singlet delta oxygen to the iodine vapor 36 by dissociating iodine molecules into atoms and bringing the iodine atoms to an electronically excited state (e.g., $^2P_{1/2}$). Flow in the diverging portion of the laser nozzle 34 is typically accelerated to supersonic velocities, and this flow from the laser nozzle 34 enters the laser cavity 38. However, other flow velocities can be used in addition to supersonic velocities. (See U.S. Pat. No. 4,267,526 as issued to McDermott et al on May 12, 1981, which describes a subsonic flow and is hereby incorporated in its entirety by reference.)

The laser cavity 38, which receives the flow from the laser nozzle 34, has an optical resonator that includes mirrors (40,42) in a vacuum enclosure 44. Using an optical feed back provided by the mirrors (40,42), a coherent laser light 46 can be extracted from the inverted population of the exited iodine atoms in the supersonic or subsonic flow. The out coupled beam of coherent laser light 46 is passed through the window 48 to the outside of the vacuum envelope. During this process the excited iodine atoms decay from a high energy state (e.g., $^2P_{1/2}$) to a lower energy state (e.g., $^2P_{3/2}$) while releasing photons at about a one and three hundred and fifteen thousandths micrometer (1.315 μm) wavelength.

A byproduct of the COIL 20 includes a depleted laser gas that flows out of the laser cavity 38 into one or more devices (e.g., a diffuser 50) for post processing, such as flow deceleration and recovery of static pressure. (See U.S. Pat. No. 6,154,478 as issued to Vetrovec on Nov. 28, 2000, which describes an example of a post processing activity and is hereby incorporated in its entirety by reference.) In addition to the depleted laser gas that flows out of the laser cavity 38, byproducts of the COIL 20 include various salts, such as sodium chloride (NaCl) or potassium chloride (KCl), and BHP 52 from the singlet oxygen generator 28 that has a temperature that is greater than the temperature of the BHP 24 originally introduced into the singlet oxygen generator 28. The salts can be removed with techniques and devices as known to those of ordinary skill in the art (e.g., a scrubber (not shown)), and the temperature of the BHP 52 can be reduced with the phase-change heat exchanger 22 of the present invention. Therefore, in this exemplary embodiment, the fluid that the phase-change heat exchanger 22 is configured to thermally condition is the BHP 52. However, other fluids of the COIL 20, fluids of other lasers and fluids in non-laser applications can be thermally conditioned with the phase-change heat exchanger 22 of the present invention.

Prior to thermally conditioning the BHP 52 with the phase-change heat exchanger 22, the BHP 52 is preferably processed to reduce gas introduced during the BHP 24 reaction with the chlorine gas 26. This degassing of the BHP 24 preferably has two steps. The first step includes reducing the amount of entrained gas and the second step includes a second degassing. In this exemplary embodiment, a coalescer 54 is provided to reduce the amount of entrained gas and a centrifugal separator 56 is provided for the second degassing. However, other devices and techniques can be used as known to those of ordinary skill in the art to reduce the gas introduced during the BHP 24 reaction with the chlorine gas 26. After the gas in the BHP 52 is reduced, the BHP 52 is presented to the phase-change heat exchanger 22 for thermal conditioning.

The thermal conditioning in this exemplary embodiment involves lowering the temperature of the BHP 52 to a temperature that is desired when it is introduced into the singlet oxygen generator 28. Preferably, the temperature of the BHP 24 is about negative forty degrees Celsius (−40° C.) to about negative ten degrees Celsius (−10° C.) when it is introduced into the singlet oxygen generator 24. As the temperature of the BHP 52 exiting the singlet oxygen generator 28 is about two degrees Celsius (2° C.) to about ten degrees Celsius (10° C.) higher that the BHP 24 entering the singlet oxygen generator 28, the temperature of the BHP 52 exiting the singlet oxygen generator 28 is preferably reduced by the phase-change heat exchanger 22.

Figure 2:
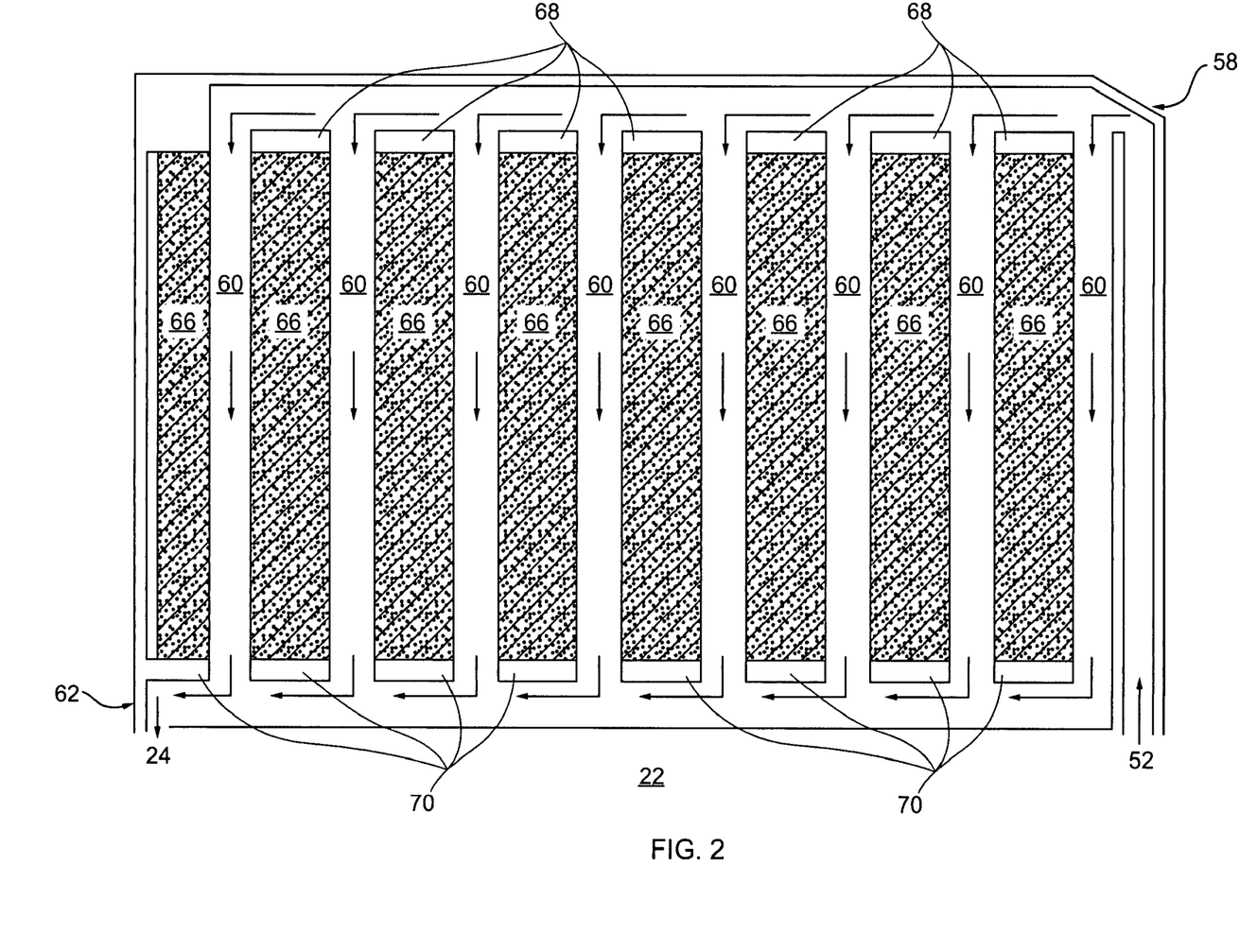
FIG. 2 is a cross-sectional view of the phase-change heat exchanger of FIG. 1.

Referring to FIG. 2, a first cross-sectional view is provided for the phase-change heat exchanger 22 of the present invention that is configured to reduce the temperature of the BHP 52 exiting the singlet oxygen generator 28 as shown in FIG. 1. The phase-change heat exchanger 22 generally includes an inlet manifold 58 that is configured to receive the fluid, which in this example is the BHP 52, and distribute the BHP 52 to conduits 60 that are configured to convey the BHP 52 to an outlet manifold 62, which in this example is coupled to an input port 64 of the singlet oxygen generator 28 as shown in FIG. 1. In addition, the phase-change heat exchanger 22 generally includes a foam structure 66 in thermal contact with at least one of the conduits 60, preferably in thermal contact with a majority of the conduits 60, and most preferably in thermal contact with substantially all or all of the conduits 60, where thermal contact exists if energy exchange can occur in the absence of macroscopic work done by the conduits 60 on the foam structure 66 or in the absence of macroscopic work done by the foam structure 66 on the conduits. Therefore, as used herein, thermal contact shall exist if energy exchange can occur in the absence of macroscopic work done by one object on another object. The foam structure 66 has ligaments interconnected to form a three-dimensional reticulated structure of open cells as subsequently described in greater detail with reference to FIG. 7. Furthermore, the phase-change heat exchanger 22 generally includes a phase-change material contained within at least a portion and preferably a substantial portion of the open cells provided by the foam structure 66, which is configured to receive thermal energy of the BHP 52 from the ligaments of the foam structure 66 as subsequently described and illustrated in greater detail.

The inlet manifold 58, outlet manifold 62 and manifold headers (68,70) of the inlet manifold 58 and an outlet manifold 62 are preferably fabricated from a material that is compatible with the fluid. In this exemplary embodiment, the inlet manifold 58, the outlet manifold 62, and the manifold headers (68,70) are fabricated from corrosion resistant steel such as 321 Cres, 304 Cres, 316 Cres, Hasterloy or Inco 625. As shown in greater detail in FIG. 3, the conduits 60 are inserted into apertures in the manifolds (68,70) and secured using techniques known to those of ordinary skill in the art. For example, the conduits 60 can be seal welded to the manifold headers (68,70) of the inlet manifold 58 and the outlet manifold 62.

Figure 3:
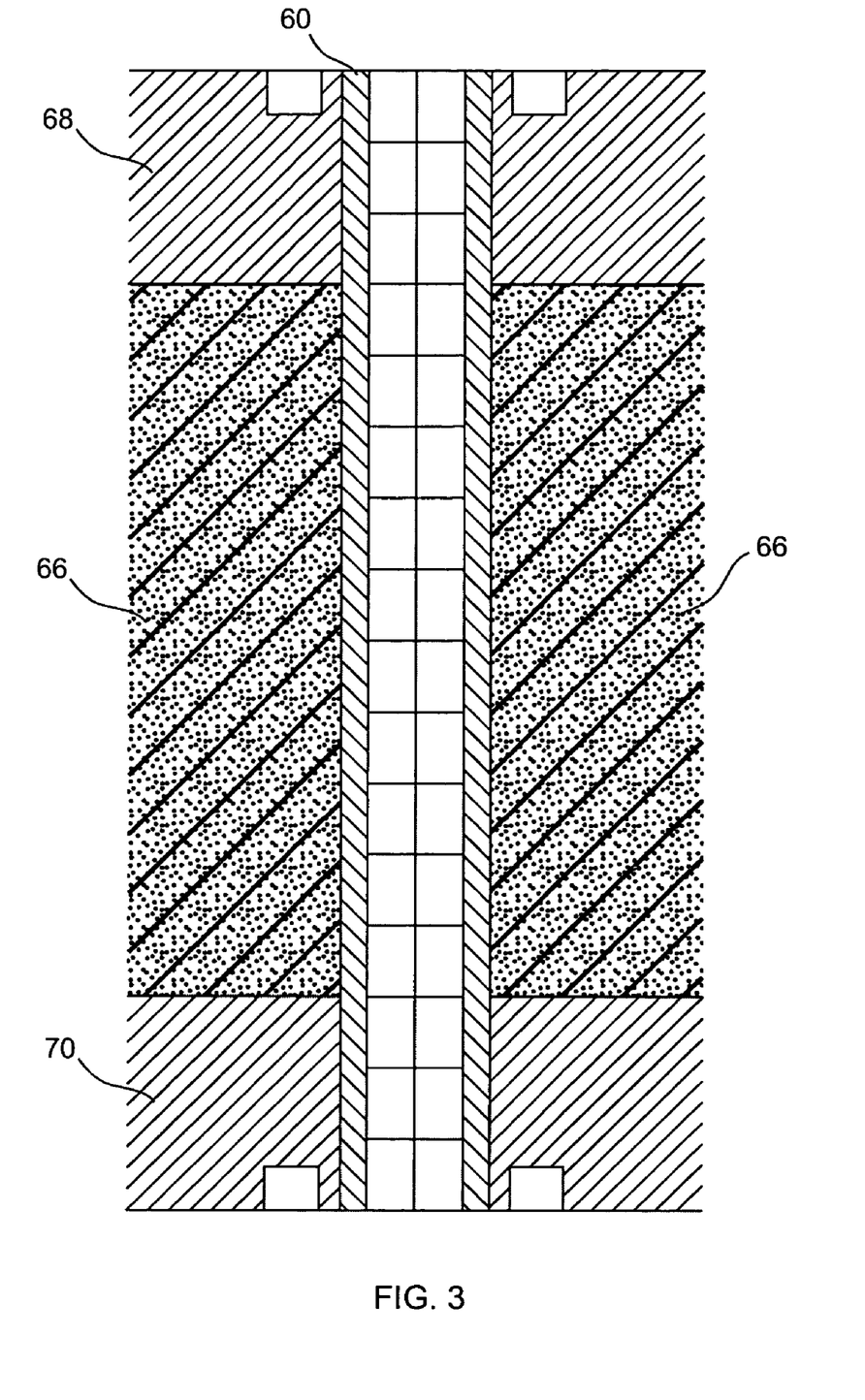
FIG. 3 is one of the conduits of the phase-change heat exchanger of FIG. 1 that is secured to the inlet manifold and outlet manifold.

Continuing with reference to FIG. 3, the conduits 60, which can be inserted and secured to the manifold headers (68,70), are preferably fabricated from a material that is compatible with the fluid and also has a thermal conductivity that is greater than one (1) Btu-ft/hr-ft-ft-F for efficient transfer of thermal energy from the BHP 52 to the foam structure 66 and phase-change material. In accordance with an exemplary embodiment, the conduits 60 are fabricated from corrosion resistant metal such as Nickel 200 or Nickel 201, which have thermal conductivities of about forty-five (45) Btu-ft/hr-ft-ft-F. However, other materials are also suitable including, but not limited to Monel 400, which has a thermal conductivity of about twelve and one-half (12.5) Btu-ft/hr-ft-ft-F, or Monel K-500, which has a thermal conductivity of about ten (10) Btu-ft/hr-ft-ft-F.

Figure 4:
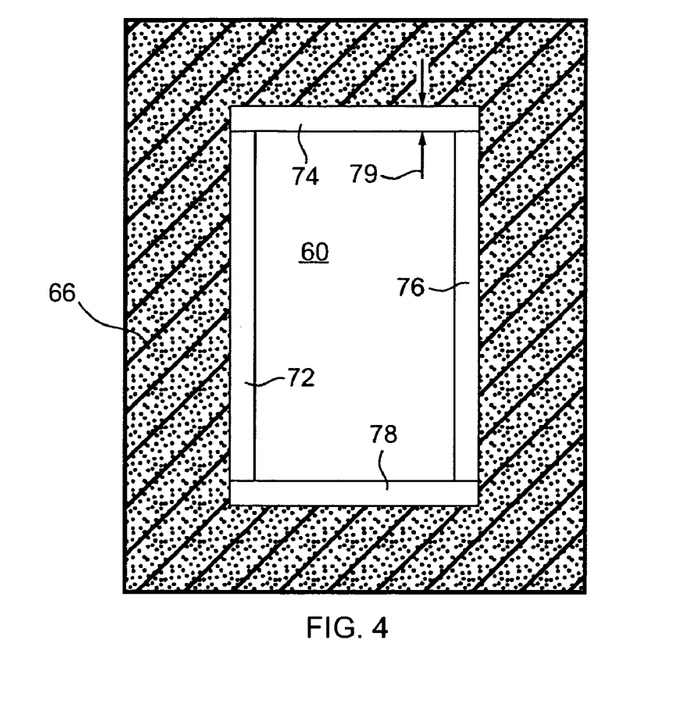
FIG. 4 is a cross-sectional view of one of the conduits of the phase-change heat exchanger of FIG. 1.

Referring to FIG. 4, the conduits 60 are preferably formed with four plates (72,74,76,78) that are bonded to form a rectangular orifice with an area that is selected to regulate the flow so that each of the conduits of the phase-change heat exchanger have substantially the same flow. However, the conduits 60 can be formed with more than four plates or less than four plates, and the shape of the orifice can be a geometric shape other than a rectangle, such as a triangle, circle, pentagon, etc. The bonding of the plates can be accomplished with any number of techniques known to those of ordinary skill in the art, such as hip bonding, hip bonding with nickel plating or diffusion bonding techniques.

The plates (72,64,76,78) forming the conduits 60 are preferably milled or otherwise formed to provide a thickness 79 that is structurally sufficient for the desired application and also milled or otherwise formed to provide an additional contact area between the BHP 52 and the conduits 60, thus providing an efficient thermal coupling between the BHP 52 within the conduits 60 and the foam structure as subsequently described in this detailed description of the invention. For example, the four plates (72,74,76,78) fabricated from nickel 200 can have a thickness 79 of between about four tenths of a millimeter (0.4 mm) and about five millimeters (5 mm). In addition, one or more of the plates are milled, and preferably chemically milled to provide protrusions (e.g., one or more ribs or fins) within one or more of the conduits 60 in order to regulate the flow rate within the conduits 60.

Figure 5:
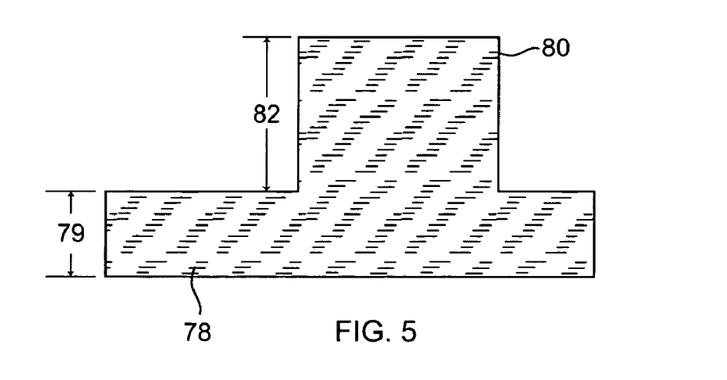
FIG. 5 is a protrusion, rib or fin that can be formed within one or more of the conduits in accordance with an exemplary embodiment of the present invention.
Figure 6:
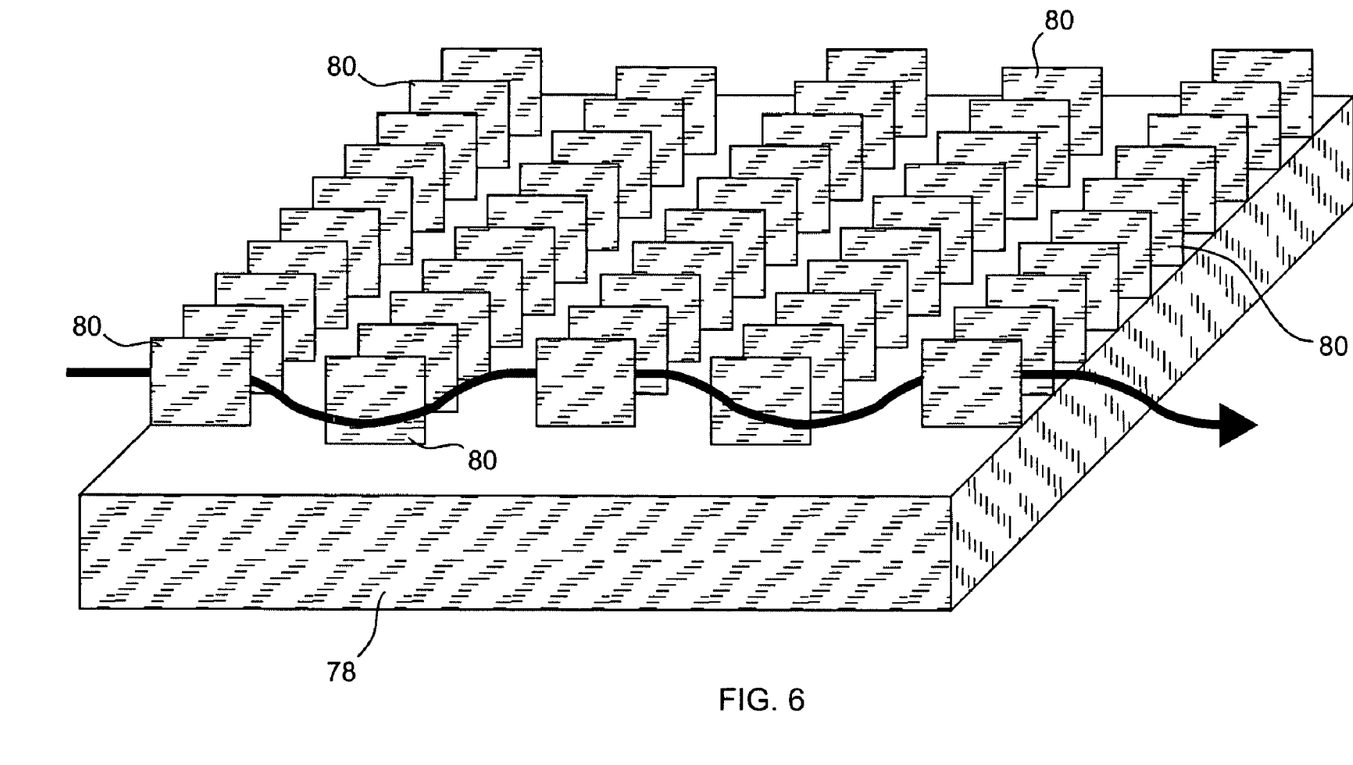
FIG. 6 illustrates multiple protrusions, ribs or fins that can be formed within one or more of the conduits in accordance with an exemplary embodiment of the present invention.

Referring now to FIG. 5, a protrusion, rib or fin 80 is illustrated in accordance with an exemplary embodiment of the present invention. The protrusion 80 preferably extends a distance 82 from one or more of the plates, such as the plate 78 shown in FIG. 4, to alter the fluid flow within the conduit or conduits for the desired application. For example, in the present exemplary embodiment, the distance 82 is about two millimeters (2 mm). As can be appreciated, any number of rib or fin configurations and distances can be utilized to alter the flow of the fluid within one or more of the conduits, such as the rib or fin configuration as shown in FIG. 6.

Figure 7:
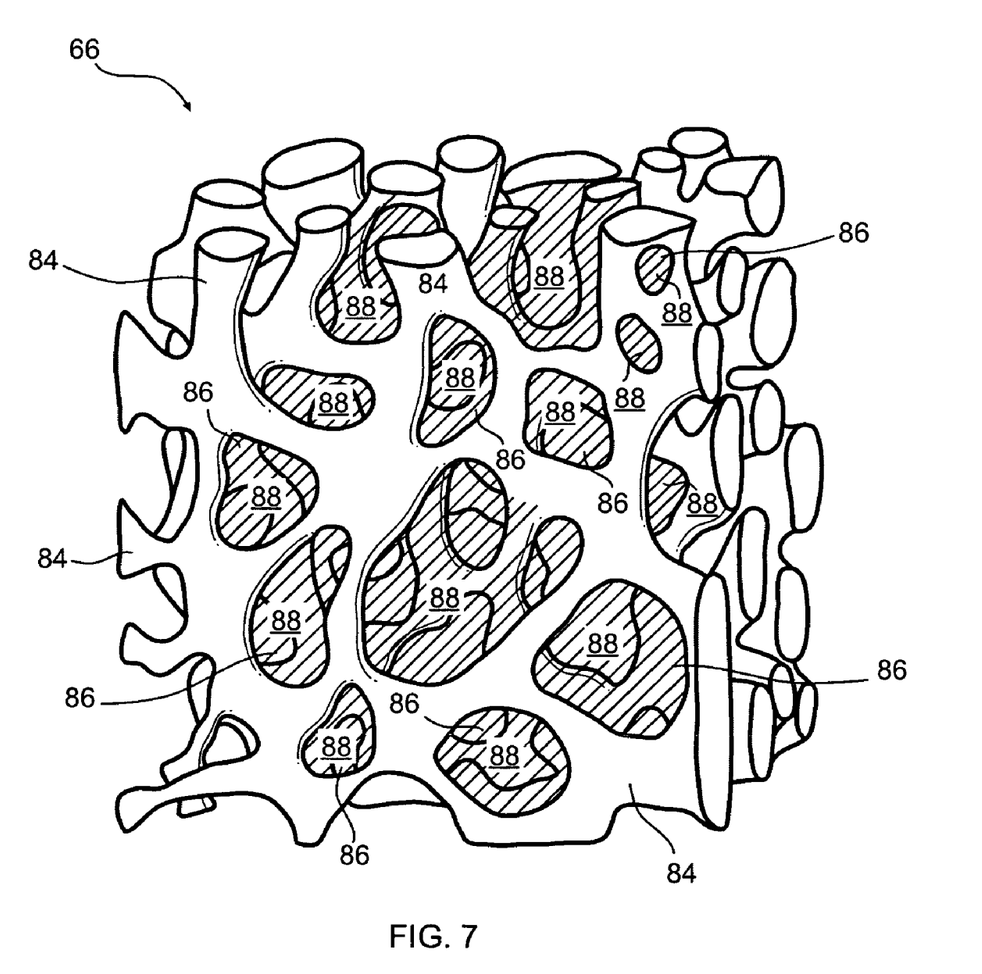
FIG. 7 is a sectional representation of the foam structure illustrating the phase-change material contained within the three-dimensional reticulated structure of open cells in accordance with an exemplary embodiment of the present invention.

Referring to FIG. 2, and as previously described in this detailed description of the invention, the phase-change heat exchanger 22 generally includes a foam structure 66 in thermal contact with at least one of the conduits 60, preferably in thermal contact with a majority of the conduits 60, and most preferably in thermal contact with substantially all or all of the conduits 60. Referring more particularly to FIG. 7, an enlarged view of a portion of the foam structure 66 is presented in accordance with an exemplary embodiment of the present invention. The foam structure 66 has ligaments 84 that are interconnected to form a three-dimensional reticulated structure having open cells 86, which interconnect in three-dimensions by virtue of the three-dimensional ligament structure. The open cells 86 of the foam structure 66 are generally polygonal in shape, but may be non-angular (e.g., oval or circular), or have any number of asymmetrical and/or symmetrical shapes.

Preferably, the foam structure 66 is a reticulated structure of open, dodecahedronal-shaped cells connected by continuous, solid metal ligaments. Such metal foam is known as Duocel, a product of Energy Research and Generation, Inc., Oakland, Calif., USA. The foam structure 66 can be prepared from numerous metals, such as aluminum, beryllium, magnesium, uranium, iron, copper, tin, titanium, zirconium, and hafnium; alloys, such as aluminum-silicon, aluminum-magnesium, and aluminum-zinc; ceramics based upon aluminum-oxide, silicon dioxide, ferric oxide, including refractories such as carbides and nitrides; or organic polymers, such as polyimides, polyaromatic ethers and thioethers, fluorocarbons, graphite, etc., and the form structure 66 can be manufactured using any number of techniques known to those of ordinary skill in the art. (See U.S. Pat. No. 3,052,967 as issued to G. W. Fischer on Sep. 11, 1962; U.S. Pat. No. 3,090,094 as issued to K. Schwartzwalder et al on May 21, 1963; U.S. Pat. No. 3,111,396 as issued to B. B. Ball on Nov. 19, 1963; U.S. Pat. No. 3,362,818 as issued to P. Schwarzkopf et al on Jan. 9, 1968; U.S. Pat. No. 3,408,180 as issued to J. Winkler on Oct. 29, 1968; U.S. Pat. No. 3,470,117 as issued to M. L. Pearce on Sep. 30, 1969, U.S. Pat. No. 3,946,039 as issued to D. Walz on Mar. 23, 1976; and U.S. Pat. No. 3,616,841 as issued to D. Walz on Nov. 2, 1971, each of which describe the preparation of metal foams, and each of which are hereby incorporated in their entirety by reference; See also U.S. Pat. No. 3,171,820, as issued to R. A. Volz on Mar. 2, 1965, which describes the preparation of a reticulated polyurethane foam, and is hereby incorporated in its entirety by reference, and U.S. Pat. No. 4,808,558 as issued to Park et al on Feb. 28, 1989 which describes the preparation of ceramic foams, and is hereby incorporated in its entirety by reference.) In addition to the numerous metals previously describe in this paragraph and other metal or non-metals not previous set forth, the foam can be prepared from carbon or at least a portion of the foam can be prepared from a carbon based material. For example, the foam can be mesophase pitch-based carbon foam developed by Carbon and Insulation Materials Technology Group, Metal and Ceramics Division, Oak Ridge National Laboratory, Oak Ridge, Tenn., 37381-6087. (See also U.S. Pat. No. 6,037,032 as issued to Klett et al. on Mar. 14, 2000, which is hereby incorporated in its entirety by reference.)

Continuing with reference to FIG. 7, a phase-change material 88 is introduced into at least a portion of the open cells of the foam structure 66, and preferably introduced into a substantial portion of the open cells of the foam structure 66. The phase-change material 88, which is in thermal contact with the ligaments of the foam structure 66, is configured to receive thermal energy of the BHP 52 from ligaments of the foam structure 66, which are in thermal contact with the conduits 60 as shown in FIG. 2. The flow of thermal energy (e.g., heat) from the BHP to the ligaments of the foam structure 66 and ultimately to the phase-change material initially alters the physical characteristics of the phase-change material 88, which is commonly referred to as a phase change, and involves a change in internal energy of the phase-change material 88.

In this example, the phase change is the change from a solid to a liquid (i.e., melting), with the transfer of energy from the BHP to the phase-change material 88 via the ligaments 66 of the foam structure 66. The phase-change material 88 is selected such that the melting point of the phase-change material 88 is greater than the freezing point of the BHP or other liquid being cooled by the phase-change heat exchanger. In this manner, the liquid does not solidify when the flow of the BHP discontinues. In the specific example of cooling the BHP 52, the freezing point of the BHP is about ten degrees Celsius (10° C.) to about twenty degrees Celsius (20° C.) below the operating temperature of the BHP 24 entering the singlet oxygen generator 28 as shown in FIG. 1. Therefore, the phase-change material 88 is selected to have a melting point within a narrow temperature range between the BHP freezing point and the operating temperature of the BHP entering the singlet oxygen generator. Other considerations in the selection of the phase-change material 88 include, but is not limited to, a preference for a material that does not melt at an excessively low temperature since a material that will melt at an excessively low temperature will generally introduce additional complexity in the refrigeration process and apparatus that is used to restore the material to its original solidified state The phase-change material 88 preferably has a relatively high latent heat of fusion of the material (i.e., the heat required to change the phase of phase-change material from a solid to a liquid), with desirable phase-change materials having latent heats of fusion in the range of about twenty five (25) Btu/lb to about one hundred and fifty (150) Btu/lb. While phase-change materials generally have low thermal conductivities, the heat transfer rate into the phase-change material is increased with a distribution of the heat through the phase-change material with the ligaments of the foam structure.

Generally, and with reference to FIG. 2, the phase-change heat exchanger 22 operates by transferring thermal energy from the BHP 52 to the conduits 60. The thermal energy received by the conduits 60 is transferred to the foam structure 66, which transfers the thermal energy into the phase-change material. The dimensions and arrangement of the one or more protrusions as shown in FIG. 6 are selected to provide thermal transfer between the BHP 52 and the conduits 60 at the desired rate and with a temperature difference that is preferably a small portion of the total temperature difference between the operating temperature of the BHP 52 and the melting point of the phase-change material, typically in the range of about one tenth (0.1) to about three tenths (0.3) of the total temperature difference. The material and mechanical dimensions of the open cells 86 as shown in FIG. 7 are also preferably selected to provide thermal transfer to the phase-change material at the desired rate and with a temperature difference between the conduits 60 and the phase-change material that is a small portion of the total temperature difference between the operating temperature of the BHP 52 and the melting point of the phase-change material, typically in the range of about two tenths (0.2) to about six tenths (0.6) of the total temperature difference. The balance of the temperature difference between the BHP and the melting point of the phase-change material occurs substantially between the foam structure and the phase-change material.

Any number of phase-change materials can be used in accordance with the present invention and selected according to the specific application, such as paraffin waxes. For example, normal decane (i.e., n-decane), which is a paraffinic hydrocarbon, can be used as the phase-change material for cooling the BHP. The n-decane has a melting point of approximately negative thirty-one degrees Celsius (−31° C.) to about negative thirty five degrees Celsius (−35° C.) and a latent heat of fusion of approximately one hundred (100) Btu/lb. However, other phase-change materials can be used in accordance with the present invention, such as water and aqueous salt solutions preferably at a eutectic composition.

After the phase-change material has change phases during the thermal conditioning of the fluid, it is preferably restored to its initial state. This can be accomplished using any number of techniques. For example, a refrigerator or heater can be thermally coupled to the phase-change heat exchanger, or another fluid can be flowed through the conduits at a temperature that will restore the phase-change material to its initial state. After the phase-change material is restored to the initial state, it is available for another interval of thermal conditioning.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A phase-change heat exchanger, comprising:
a plurality of conduits configured to convey a fluid;
a foam structure in thermal contact with at least one of said plurality of conduits, said foam structure having a plurality of ligaments interconnected to form a three-dimensional reticulated structure of a plurality of open cells; and
a phase-change material contained within at least a portion of said plurality of open cells, said phase-change material configured to receive thermal energy of said fluid from said plurality of ligaments.

2. The phase-change heat exchanger of claim 1, further comprising an intake manifold configured to distribute the fluid to said plurality of conduits.

3. The phase-change heat exchanger of claim 1, further comprising an outlet manifold configured to collect the fluid from said plurality of conduits.

4. The phase-change heat exchanger of claim 1, wherein each of said plurality of conduits is fabricated from a material having a thermal conductivity greater than one (1) Btu-ft/hr-ft-ft-F.

5. The phase-change heat exchanger of claim 1, wherein each of said plurality of conduits is fabricated from Nickel 201.

6. The phase-change heat exchanger of claim 1, further comprising a protrusion within at least one of said plurality of conduits.

7. The phase-change heat exchanger of claim 1, further comprising a plurality of protrusions in each of said plurality of conduits that are configured to regulate flow of the fluid.

8. The phase-change heat exchanger of claim 1, wherein the open cells have polygonal shapes.

9. The phase-change heat exchanger of claim 1, wherein the foam structure has a reticulated structure of open, dodecahedronal-shaped cells connected by solid metal ligaments.

10. The phase-change heat exchanger of claim 1, wherein the foam structure is prepared from aluminum.

11. The phase-change heat exchanger of claim 1, wherein at least a portion of the foam structure is prepared from a carbon material.

12. The phase-change heat exchanger of claim 11, wherein said at least said portion of the foam structure is prepared from a mesophase pitch-based carbon.

13. The phase-change heat exchanger of claim 1, wherein the phase-change material has a latent heat of fusion that is greater than about twenty five (25) Btu/lb.

14. The phase-change heat exchanger of claim 1, wherein the phase-change material has a latent heat of fusion that is less than about one hundred and fifty (150) Btu/lb.

15. The phase-change heat exchanger of claim 1, wherein the phase-change material is a paraffinic hydrocarbon.

16. A Chemical Oxygen Iodine Laser (COIL), comprising:

a singlet oxygen generator that is configured to receive a chlorine gas, receive a Basic Hydrogen Peroxide (BHP) and produce an excited oxygen gas in a metastable state;

a laser nozzle that is configured to mix said excited oxygen gas and an iodine vapor in order to facilitate an energy transfer from said excited oxygen gas to said iodine vapor and produce an inverted population of exited iodine atoms in said iodine vapor;

a laser cavity configured to extract said inverted population of exited iodine atoms from said iodine atoms and produce a coherent laser light; and a phase-change heat exchanger to thermally condition said BHP exiting said singlet oxygen generator, said phase-change heat exchanger comprising:
  a plurality of conduits configured to convey said BHP;
  a foam structure in thermal contact with at least one of said plurality of conduits, said foam structure having a plurality of ligaments interconnected to form a three-dimensional reticulated structure of a plurality of open cells; and
  a phase-change material contained within at least a portion of said plurality of open cells, said phase-change material configured to receive thermal energy of said BHP from said plurality of ligaments.

17. The COIL of claim 16, wherein the phase-change material is a paraffinic hydrocarbon.

18. The COIL of claim 16, wherein the phase-change material is normal decane (n-decane).

19. The COIL of claim 16, wherein the phase-change material has a melting point that is greater than about thirty one degrees Celsius (−31° C.) and less than about thirty five degrees Celsius (−31° C.).

20. The COIL of claim 16, wherein the phase-change material has a latent heat of fusion of approximately one hundred (100) Btu/lb.

21. The COIL of claim 16, wherein the phase-change material is a eutectic composition of water and an aqueous salt solution.

22. The COIL of claim 16, wherein the foam structure has a reticulated structure of open, dodecahedronal-shaped cells connected by solid metal ligaments.

23. The COIL of claim 16, wherein the foam structure is prepared from aluminum.

24. The COIL of claim 16, wherein at least a portion of the foam structure is prepared from a carbon material.

25. The COIL of claim 16, wherein said at least said portion of the foam structure is prepared from a mesophase pitch-based carbon.

* * * * *